United States Patent Office 3,406,958
Patented Oct. 22, 1968

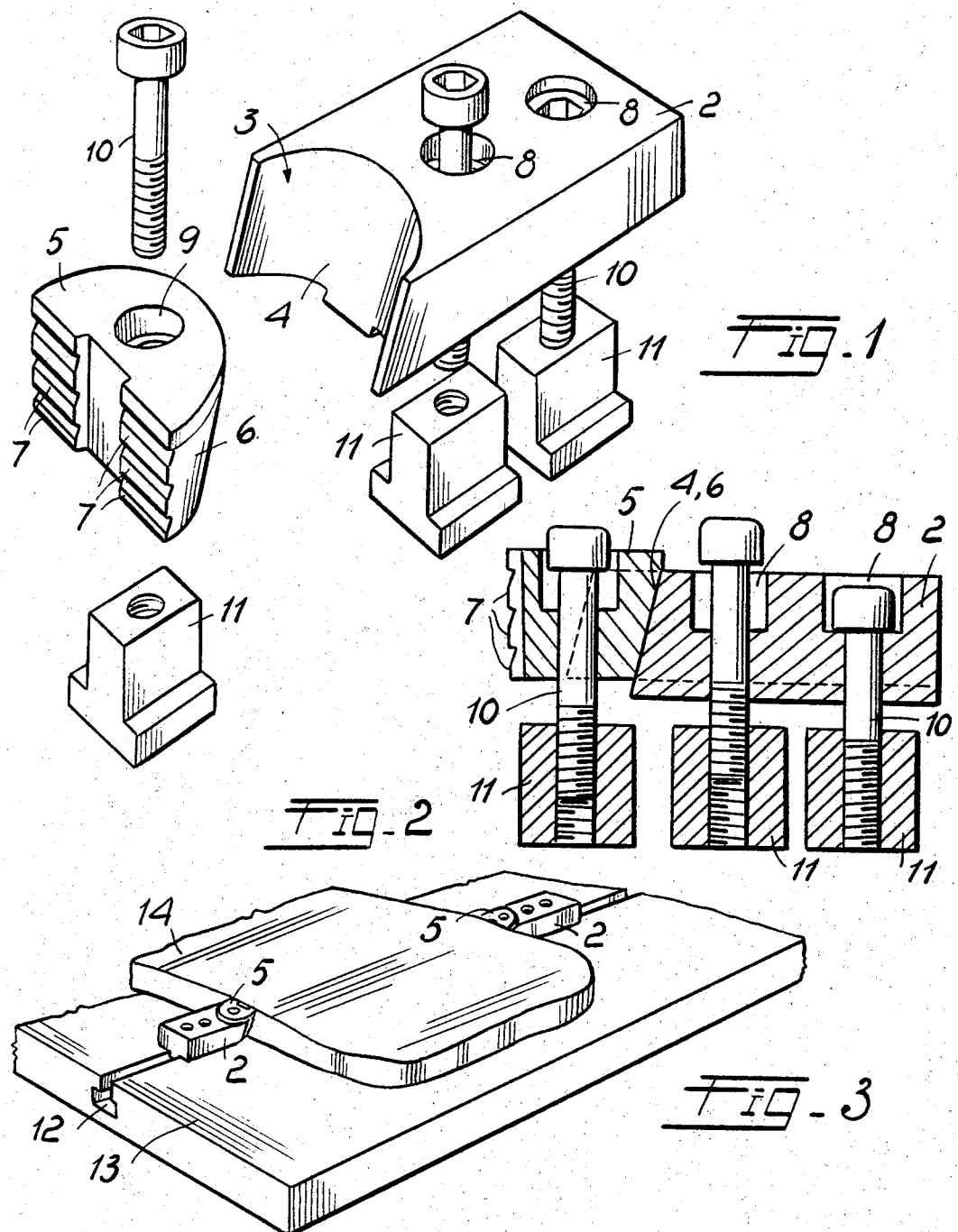

3,406,958
STRUCTURE OF A SCREW TO FIX PIECES TO BE WORKED ON A WORK BENCH OF A TOOL MACHINE TYPE
Aldo Geneloni and Loredano Bartoletti, both of Via Marcona 49, Milan, Italy
Filed June 15, 1966, Ser. No. 557,815
Claims priority, application Italy, June 16, 1965, 13,512/65
4 Claims. (Cl. 269—137)

The present invention relates to a structure of a screw to fix pieces to be worked on a work bench of a tool machine type.

It is known that at the present time the parts to be worked on machine tools, such as, for instance, milling machines and planing machines, are fastened to the work-table by the use of brackets which, due to their fixed positioning and the space taken up by them, form relatively substantial drawbacks to the operation of the machine tool.

The use of such brackets results in substantial drawbacks which up to now have been overcome, and only in part, by the use of complicated and costly holding devices.

These drawbacks reside in the fact, that the piece to be worked on the machine tool must first of all be treated in such manner, that it has flat surfaces at the points of holding and, furthermore, since the normal brackets always protrude from the plane of work, it is necessary in many cases to shift them in order to be able to complete the entire operation. This results in a loss of time, lack of precision and discontinuity of the surface worked, which shows the traces of the various passes of the tool after each displacement.

It is one object of the present invention to provide a structure of a screw to fix pieces to be worked on a work bench of a tool machine type which is able completely to obviate the above-mentioned drawbacks, that is to say, which permits the fastening of a piece of any shape, without it being necessary to provide for this purpose any preliminary work on the piece itself, and making it possible to effect the working without shifting the piece or the points of attachment.

It is another object of the present invention, to provide a structure of a screw to fix pieces to be worked on a work bench of a tool machine type, which can easily be placed in operation and lends itself to generally universal application, assuring substantial rigidity of the part fastened by it, even subjected to substantial, repeated stresses, which are usually to be avoided by the fastening means of the known type.

It is still another object of the present invention to provide a structure of a screw to fix pieces to be worked on a work bench of a tool machine type, which takes up a limited amount of space, is easily handled and has high properties of mechanical strength.

It is yet another object of the present invention to provide a structure of a screw to fix pieces to be worked on a work bench of a tool machine type, wherein the vise-like structure in question is easily made from material readily available on the market and suitable for operations of the known type, so that it is advantageous also from a strictly financial viewpoint.

It is a further object of the present invention to provide a structure of a screw to fix pieces to be worked on a work bench of a tool machine type, which comprises a plate-shaped element having on at least one of its ends a transverse curvature frustoconical profile, a body having a side surface which at least in part has a profile which matches the profile of said cavity, and removable means for fastening said plate-shaped element and said body to the work-table of an ordinary machine tool.

With these and other objects in view, which will become apparent in the following detailed description, the present invention will be clearly understood in connection with the accompanying drawing, in which:

FIGURE 1 is a perspective, exploded view of the vise-like structure, in accordance with the present invention;

FIG. 2 is a longitudinal section of the vise-like structure, disclosed in FIG. 1;

FIG. 3 is a perspective top view of a pair of vise-like structures in accordance with the present invention used for the fastening of a piece to be worked on the machine tool.

Referring now to the drawing, the vise-like structure 1, designed in accordance with the present invention, is formed of a plate-shaped element 2, which is in the form substantially of a parallelepiped and which, at one of its ends, has a curvature 3 with a frustoconical inside surface 4 with the conicity facing downwardly; in this frustoconical cavity there is intended to be engaged a part or body 5 of substantially semicircular cross-section, which has a peripheral side surface 6 of frustoconical profile with the conicity facing downwardly and precisely complementary to the frustoconical profile of the cavity 3; the part 5 furthermore defines at its front a surface having a plurality of ridges 7, the flat sections of which define a plane which is inclined slightly downwardly and inwardly with respect to the part 5 itself.

Both the plate-shaped part 2 and the semicircular part 5 are provided with holes 8 and 9, respectively, which pass through them and in which there are seated bolts 10, which are engaged at their bottom for threading in male parts 11 which, in their turn, are slidably associated with guides 12 usually provided in the work-table 13 of an ordinary machine tool.

For the fastening of a work piece 14 to the work-table 13, it is, therefore, merely necessary to position two vises in accordance with the present invention opposite each other and in contact with the work piece 14 and then to tighten the bolts 10 in the male parts; due to the special connection between the part 5 of frustoconical surface with the cavity 3 of the plate-shaped element 2, which is also of frustoconical surface, as the part 5 is locked by tightening the corresponding bolt 10, it is pushed strongly against the side surface 4 of the work piece 14 to be worked, consequently locking the part 5, in practically non-removable manner. In repeated and prolonged operations, it can be noted how the fastening obtained with vises of the structure in accordance with the present invention advantageously achieves the securing of the work piece 14 to the work-table 13; this rigidity of fastening is furthermore increased by the special shape of the front face of the part 5 and by its slight inclination. Furthermore, the practically articulated connection between the part 5 and the corresponding cavity 3 of the plate-shaped part 2 has been found particularly advantageous; as a matter of fact, this connection permits the locking of work pieces having a side surface of any shape, since during the locking of the part 5, as a result of the tightening of the corresponding bolt 10, the part 5, since it can rotate within the cavity 3, automatically engages and adapts itself to the shape, even if varied, of the work piece 14 to be worked.

From what has been described and illustrated, it can easily be noted that the vise-like structure in accordance with the present invention makes it possible, once the part to be worked has been fastened to the work-table, to subject the entire upper surface of the work piece to the desired machining, thereby obviating the drawback of obtaining finished parts having a certain discontinuity of machining, as is the case at the present time, by the use of fastening means of the bracket type.

The present invention is capable of numerous variations and modifications, all of which fall within the scope of the inventive concept; furthermore, the details may be replaced by other technically equivalent details.

While we have disclosed several embodiments of the present invention, it is to be understood that these embodiments are given by example only and not in a limiting sense, the scope of the present invention being determined by the objects and the claims.

We claim:

1. A vise-like structure for the fastening of a work piece to be machined to the work-table of an ordinary machine tool, comprising
   a plate-shaped part having at one end at least one cavity including a transverse, concave curvature of frustoconical profile,
   a body having a side surface at least partially of a convex profile complementary to said concave profile of said cavity,
   a work-table adapted to be a portion of a machine tool, and
   removable means for fastening said plate-shaped part jointly with said body to said work-table.

2. The structure, as set forth in claim 1, wherein said curvature of said plate-shaped part has a conicity diminishing downwardly toward said work-table.

3. The structure, as set forth in claim 1, wherein said body is of substantially semi-circular cross-section and has a frustoconical side surface of a conicity diminishing downwardly toward said work-table, said body has a front face including a plurality of ridges comprising flat sections disposed in plane slightly inclined downwardly and inwardly.

4. The structure, as set forth in claim 3, wherein said body fits slidably with its convex portion in said concave portion of said plate-shaped part.

References Cited

UNITED STATES PATENTS

| | | | |
|---|---|---|---|
| 2,637,249 | 5/1953 | Swenson | 269—134 |
| 2,667,799 | 2/1954 | Rzepela | 269—138 |
| 3,090,612 | 5/1963 | Rouse | 269—91 |

ROBERT C. RIORDON, *Primary Examiner.*

D. R. MELTON, *Assistant Examiner.*